United States Patent
Itabashi

(10) Patent No.: US 7,292,850 B2
(45) Date of Patent: Nov. 6, 2007

(54) COMMUNICATION PROCESSING APPARATUS, COMMUNICATION PROCESSING METHOD, AND COMPUTER PROGRAM

(75) Inventor: Tatsuo Itabashi, Tokyo (JP)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 10/533,529

(22) PCT Filed: Dec. 8, 2003

(86) PCT No.: PCT/JP03/15653

§ 371 (c)(1),
(2), (4) Date: May 3, 2005

(87) PCT Pub. No.: WO2004/054177

PCT Pub. Date: Jun. 24, 2004

(65) Prior Publication Data

US 2006/0019652 A1    Jan. 26, 2006

(30) Foreign Application Priority Data

Dec. 9, 2002    (JP)    ............................... 2002-356981

(51) Int. Cl.
*H04Q 7/20* (2006.01)
*G01S 3/02* (2006.01)

(52) U.S. Cl. .................. 455/425; 455/446; 342/457; 725/81

(58) Field of Classification Search ............... 455/425, 455/6.3, 450, 456, 446; 342/457; 725/81
See application file for complete search history.

(56) References Cited

U.S. PATENT DOCUMENTS

| | | | |
|---|---|---|---|
| 5,696,900 A | | 12/1997 | Nishigaya et al. |
| 5,802,473 A | * | 9/1998 | Rutledge et al. ............ 455/446 |
| 5,862,452 A | * | 1/1999 | Cudak et al. ................. 725/81 |
| 6,014,406 A | | 1/2000 | Shida et al. |
| 6,639,554 B2 | * | 10/2003 | Kim et al. .................. 342/457 |
| 2006/0019652 A1 | * | 1/2006 | Itabashi ...................... 455/425 |

FOREIGN PATENT DOCUMENTS

| | | |
|---|---|---|
| JP | 08-056263 | 2/1996 |
| JP | 08-298687 | 11/1996 |
| JP | 11-088331 | 3/1999 |
| JP | 2002-290420 | 10/2002 |

* cited by examiner

*Primary Examiner*—William D. Cumming
(74) *Attorney, Agent, or Firm*—Bell, Boyd & Lloyd LLP

(57) ABSTRACT

A Communication processing device, a communication processing method, and a computer program are provided. A configuration is provided wherein multiple access points are set as slaves, a mobile device is set as a master, so as to enable use of multiple resources at different access points. A mobile communication processing device searches access points, generates pico-cell information from communication settings information for each searched access point, generates a mapping table storing available address information conforming to a communication protocol applied to communication with each access point set in the pico-cell information. An address corresponding to a communication protocol is set based on the mapping table, and communication status setting processing is performed based on the pico-cell information to perform communication with each slave. According to this configuration, data processing using various resources connected to multiple access points set as slaves can be performed.

17 Claims, 12 Drawing Sheets

| SEQUENCE # | PACKET TYPE | INFORMATION EXCHANGED | RESULTS, AND LOCATION WHERE REFLECTED |
|---|---|---|---|
| S603 | DEVICE SEARCH (BROADCAST) | CONTROL COMMAND FOR DEVICE SEARCH EQUIVALENT TO IQ WITH BLUETOOTH | WAITING NODE REACTS (SLAVE CANNOT RESPOND DURING COMMUNICATION) |
| S604  S607 S611 | DEVICE SEARCH ACK | DEVICE SEARCH ACK AND SENDER ADDRESS EQUIVALENT TO FHS WITH BLUETOOTH | RENEW PICO-CELL INFORMATION |
| S615  S622 S629 | SERVICE SEARCH | CONTROL COMMAND FOR SERVICE SEARCH ADDRESS SPECIFIED FOR EACH ACCESS POINT SET TO RECEIVING SLOT OF RECIPIENT WITH BLUETOOTH | SERVICE SEARCH |
| S616  S623 S630 | SERVICE SEARCH ACK | SERVICE SEARCH ACK NETWORK INFORMATION AND RESOURCE INFORMATION | UPDATE MAPPING TABLE |
| S704 | DATA | ENTIRE IP PACKET INCLUDING RECEPTION STANDBY REQUEST COMMAND IN PAYLOAD PORTION IS HANDLED AS DATA | ROUTED TO T-IP-1 FROM RECEIVED AP1-IP-1, AND EXECUTED |
| S714 | DATA | ENTIRE IP PACKET INCLUDING TRANSMISSION REQUEST COMMAND IN PAYLOAD PORTION IS HANDLED AS DATA | ROUTED TO T-IP-2 FROM RECEIVED AP-IP-2, AND EXECUTED |
| S716 | IP PACKET (NOT LIMITED TO WIRELESS) | IP APPLICATION (FOR EXAMPLE: FTP) CONTROL COMMAND AND DATA INFORMATION | PROCESSING ACCORDING TO COMMANDS AND INFORMATION AT RECEIVING APPLICATION |

FIG. 11

COMMUNICATION PROCESSING APPARATUS, COMMUNICATION PROCESSING METHOD, AND COMPUTER PROGRAM

CROSS REFERENCE TO RELATED APPLICATION

The present application claims priority to Japanese Patent Document No. 2002-356981 filed on Dec. 9, 2002, the disclosure of which is herein incorporated by reference.

BACKGROUND OF THE INVENTION

The present invention relates to a communication processing device, a communication processing method, and a computer program. More particularly, the present invention relates to a communication processing device, a communication processing method, and a computer program, wherein with master-slave type small-scale wireless communication processing, setting a mobile terminal of a user as a master and an access point which the mobile terminal can access as a slave, enables the mobile terminal to perform communication using access points as multiple slaves, so data processing using resources connected to two or more access points can be performed.

In recent years, portable personal computers, cell phones, and so forth have come into widespread use, and many users carry small devices having communication functions and information processing functions, and connect to networks outdoors or at other locations to perform communication via network. In such a mobile computing environment, it is assumed that devices which are connected to a network and receive services via the network, such as portable communication terminals, PDAs, mobile computers, or the like, are nodes which move. In order to use a moving node, it is necessary that no communication interruption due to moving of the node occurs.

In various fields, techniques for realizing ubiquitous computing, which is being proposed as an environment where users can readily connect to a network at any time and any place, is being researched and developed. As one of the techniques, there has been an argument over making a certain space intelligent. For example, a system or the like wherein two or more access points (AP) distributed and disposed in movement space of a user track the movement of users, and network devices work in conjunction with the movements of the user, has been proposed.

However, such a user tracking system works effectively when the range of movement of the user is restricted, and it is difficult to build a user tracking processing system throughout all space when the range of movement of the user is not restricted. Accordingly, there is the problem of scalability. Also, in the event of performing user management in increments of a predetermined space, there is another problem in that privacy of a user who uses resources of a predetermined space is not protected. For example, there is the risk that a resource administrator in a certain space might record contents information used by a user.

On the other hand, as a system employing the existing infrastructure, a personal communication service dispersion system which employs various existing various communication networks by switching over as appropriate, has been proposed (for example, Patent Document No. 1: Japanese Unexamined Patent Application Publication No. 8-56263). The system disclosed in Patent Document No. 1 ais a system which enables integrating and using different networks such as mail services or phone services or the like.

The system disclosed in this Patent Document No. 1 comprises a resource control program which manages various hardware resources such as a PC connected to a physical network, a service control program which controls a physical network for each user ID as user identification information, and a service control device having a directory for searching each of the control programs and hardware, and in the event of performing communication processing wherein a user inputs a user ID and uses resources for example, the service control device performs a directory search, and performs transfer destination search for input signals from the user, routing processing, and so forth.

However, with a configuration described in the Patent Document, a resource control program, a service control program, and a service control device having a directory for searching these control programs and hardware need to be set for each predetermined hardware resource, so there is the problem of scalability as well. Also, processing base on input of a user identifier is required, so there is the problem of user privacy protection.

Meanwhile, as a short-distance communication control method, a master-slave type communication method such as BLUETOOTH for example, has come to be widely employed in these days. In such a master-slave type communication control method, a master for performing communication intermediary processing within a small-scale network (pico-network) is disposed, and a communication device (slave) in a pico-network can perform communication via the master. In such a master-slave type communication control method, entering a newly participating slave to a pico-network is easily carried out, and breakaway from the pico-network is also easily carried out, accordingly, it can be said that this method is suitable for communication with mobile terminals.

For example, a wireless communication system using BLUETOOTH has the advantage that there is no directivity and transparency is high, as compared with infrared data communication methods such as the conventional IrDA (Infrared Data Association). Hence, in the event of employing communication with high directivity such as with IrDA, it is necessary to dispose communicating devices so as to face one another appropriately, however, in a communication system such as with BLUETOOTH, there is no positional restriction such as described above.

The standards of BLUETOOTH are managed by BLUETOOTH SIG Inc., and details can be freely obtained by anyone from BLUETOOTH SIG Inc.; for example, with communication using BLUETOOTH, a device detection message for detecting devices which exist in a surrounding area is transmitted by broadcasting from a master device controlling communication.

A master can detect devices which exist in a surrounding area, that is, communicable devices, by response messages transmitted from devices (slaves) which receive this device detection message. Also, in the event of establishing communication with a specific device from the detected devices, the master identifies the device based on identification information of each device included in the response message, and establishes the communication.

In BLUETOOTH, information referred to as a BLUETOOTH device address is assigned to each device as information identifying such a device. This address is unique as to each device, which is employed in various kinds of processing such as administering devices.

Up to seven slaves can belong to one master in the same pico-net in BLUETOOTH communication. All devices belonging to the same pico-net are in a synchronized state on a frequency axis (frequency hopping pattern) and time axis (time slot). Furthermore, a network can be configured by connecting multiple pico-nets as well, which is referred to as a scatter net.

Moreover, in BLUETOOTH, with regard to data sent and received with wireless communication or the communication procedures thereof, specifications referred to as profiles, in which the procedures are arranged for each service, are being formulated, and services which each device can provide are represented according to this profile.

In a PAN (Personal Area Network) profile, a communication method between slaves in a pico-net is regulated so that the pico-net is regarded as one network, and devices belonging to the pico-net configured based on the PAN profile can transmit and receive various kinds of data. Similarly, with regard to scatter nets, stipulations are being planned wherein the scatter net is regarded as one network so as to transmit and receive various kinds of data. This network may be a network based on IP (Internet Protocol), for example.

Now, in the event of configuring such a network, the master obtains information regarding to peripheral devices using the aforementioned device detection messages to determine which device should be a master, and which device should be a slave, or which service should be employed to perform communication, based on user instructions, for example.

Application of a mobile wireless communication terminal of a user to master-slave type wireless communication involves the mobile terminal belonging to various pico-nets and performing communication via the master set in the pico-net.

Suppose, for instance, there is a configuration such as that illustrated in FIG. 1. A mobile terminal 100 which a user owns comprises a control unit 111, memory unit 112, output unit 113, input unit 114, and a communication device 101 for performing short-distance communication such as BLUETOOTH. On one hand, there are access points (AP) 121, 122, and 131 which are disposed in space with a distributed and fixed formation, and various devices (hardware resources) 123 and 132 such as a VTR, printer, PC, and so forth are connected to each access point. Establishing communication with an access point using the mobile terminal 100 allows users to use the devices (resources) connected to the access point.

In such an environment, an access point (AP) 121 fixedly provided is set as a master, and forms a pico-net 120, and in the event that the mobile terminal 100 which the user owns moves into a region of the pico-net 120, the mobile terminal 100 is identified as a slave through predetermined device search processing, thereby enabling communication via the access point 121 which is the master in the pico-net 120 to be performed. Consequently, the device (resource) 123 connected to the access point 121 can be used.

However, the mobile terminal 100 cannot use the device 132 shown in the upper portion of FIG. 1. The mobile terminal 100 does not belong to the pico-net set as a communicable region of the access point (AP) 131 connected to the device 132, so the access point (AP) 131 set as a master does not identify the mobile terminal 100 as its slave.

In order to solve this situation, it is necessary, as shown in FIG. 2 for example, for the mobile terminal 100 to comprise multiple wireless communication devices 151, 152, and 153, and perform communication via each device, so that the mobile terminal 100 can belong to multiple pico-nets and communicate with the access points (AP) set as the master of each pico-net to use the resources connected to each access point in parallel.

In the configuration shown in FIG. 2, the mobile terminal 100 belongs to a pico-net 163 set as a communicable region of the access point (AP) 121, to a pico-net 161 set as a communicable region of the access point (AP) 131, and to a pico-net 162 set as a communicable region of the access point (AP) 122, wherein each access point is assigned to be a master, and the mobile terminal 100 is assigned to be a slave, thereby enabling communication in each pico-net to be performed in parallel. Consequently, connection resources 123 and 132 at each access point can be used in parallel.

However, as described above, in a configuration wherein two or more access points are set as a master, in order to realize communication via each access point, the mobile terminal 100 needs to comprise multiple wireless communication devices 151, 152 and 153, which causes a problem.

FIG. 3 illustrates device and software configuration which a mobile terminal requires. (a) illustrates a configuration of hardware 172 and software 171 which a mobile terminal has to be equipped with in order to perform communication by connection to only one access point as described above with reference to FIG. 1. In the event of performing communication conforming to a specific communication protocol, one communication device for transmitting/receiving data as hardware, and one each of a device driver for controlling a communication device, a network protocol stack for executing processing of a specific communication protocol, and an application program for executing specific processing for transmitting/receiving data, as software, is sufficient for communication processing conforming to a specific protocol.

However, in a configuration shown in FIG. 2, assuming that a different communication protocol is applied to each access point 121, 122, and 131, the mobile terminal needs hardware 172 and software 171 in a configuration shown in FIG. 3(b). In order to perform communication conforming to three types of communication protocols, three communication devices for transmitting/receiving data as hardware are required, and with regard to software, three types of device drivers for controlling each communication device, three network protocol stacks for executing processing of three types of communication protocols, and further an application program for executing specific processing for transmitting/receiving data, are required.

As described above, in the event that two or more access points are set as a master, and each access point performs communication with a different communication protocol, the configuration shown in FIG. 3(b) is required, thereby causing the problem of increased costs for mobile terminals.

SUMMARY OF THE INVENTION

The present invention provides in an embodiment a communication processing device, a communication processing method, and a computer program, wherein in master-slave type small-scale wireless communication processing, a mobile terminal of a user is set as a master, and access points accessible from mobile terminals are set as slaves, thereby enabling the mobile terminals to perform communication using two or more access points as multiple slaves, and data processing to use multiple resources connected to each access point.

According to an embodiment of the present invention, a communication processing device comprises:

a communication unit for performing data communication with an external device;

a control unit, for searching communicable access points, generating communication settings information for each searched access point as pico-cell information, performing communication information acquisition processing for generating a mapping table which stores available address information which is set in the pico-cell information corresponding to a communication protocol applicable to communication as to each access point, setting an address conforming to the communication protocol based on the mapping table, and executing communication preparatory processing for performing communication status setting processing based on the pico-cell information; and a memory unit for storing the mapping table and the pico-cell information.

Further, according to one embodiment of the communication processing device of the present invention, the communication processing device has a configuration wherein parallel communication processing is performed as to different access points to which different communication protocols are applied, or different connection resources via the different access points, by parallel processing to which a plurality of different network protocol stacks in the control unit are applied.

Further, according to one embodiment of the communication processing device of the present invention, the control unit has a configuration wherein a small-scale network is set such that the device itself is a master and one or more communicable access points are slaves, and resource information collection processing regarding a resource connected by cable to the access point from one or more access points set as slaves is performed, and processing to enter the collected resource information to the mapping table is executed.

Further, according to one embodiment of the communication processing device of the present invention, the communication processing device performs wireless communication with BLUETOOTH communication; with the control unit executing processing for searching one or more communicable access points with inquiry packet transmission using broadcasting, setting a pico-net wherein an access point which transmits a response packet for a broadcast packet is a slave, performing service search processing using SDP (Service Discovery Protocol) as to one or more communicable access points set as slaves, and registering obtained resource information to the mapping table based on the service search processing.

Further, according to one embodiment of the communication processing device of the present invention, the mapping table is a table which stores information for performing communication processing conforming to each communication protocol as a directory configuration, including an address information data file which stores address information required for communication to which each communication protocol is applied, and a resource information file which stores accessible resource information based on communication conforming to each communication protocol; with the control unit having a configuration wherein address and resource information is obtained from the mapping table, and processing to generate and send a data processing request packet in which a resource address is set as a destination address is performed based on the obtained resource information.

Further, according to one embodiment of the communication processing device of the present invention, communication status setting processing based on the pico-cell information processed by the control unit includes synchronization processing in a physical layer comprising a communication unit.

Further, according to one embodiment of the communication processing device of the present invention, the control unit has a configuration wherein search processing for communicable access points is performed as transmission processing for a broadcast packet, with generating and updating processing for the pico-cell information performed based on response transmission for the broadcast packet.

Further, according to one embodiment of the communication processing device of the present invention, the control unit has a configuration wherein information including commands information applicable to resource address information and resources, as resource information regarding a resource connected by cable to an access point from one or more communicable access points is collected, with processing to enter the collected information to the mapping table being executed.

According to another embodiment of the present invention, a communication processing method for performing data communication as to an external device comprises:

a search step for searching communicable access points;

a pico-cell information generating step for generating communication settings information for each searched access point as pico-cell information;

a mapping table generating step for generating a mapping table to which available address information conforming to a communication protocol applicable to communication as to each access point set in the pico-cell information is stored; and a communication preparatory step for setting an address conforming to a communication protocol based on the mapping table, and performing communication status setting processing based on the pico-cell information.

Further, according to one embodiment of the communication processing method of the present invention, the communication processing method further includes a step for performing parallel communication processing which covers different access points to which different communication protocols are applied, and different connection resources via the different access points, by parallel processing to which a plurality of different network protocol stacks are applied.

Further, according to one embodiment of the communication processing method of the present invention, the communication processing method further includes a step for setting a small-scale network wherein the device itself is a master and one or more communicable access points are slaves, and performing resource information collection processing regarding resources connected by cable to the access point from one or more communicable access points set as slaves, and performing processing to register the collected resource information to the mapping table.

Further, according to one embodiment of the communication processing method of the present invention, the communication processing method performs wireless communication using BLUETOOTH communication, with the search step being a step wherein one or more communicable access points with inquiry packet transmission using broadcasting is searched, and a pico-net wherein the access points which transmit a response packet as to a broadcast packet are slaves is set; the method further comprising a step for performing service search processing using SDP (Service Discovery Protocol) as to one or more communicable access points set as slaves, and performing processing to enter resource information obtained based on the service search processing to the mapping table.

Further, according to one embodiment of the communication processing method of the present invention, the mapping table being a table which stores information for performing communication processing conformed to each communication protocol as a directory configuration, and includes an address information data file which stores address information required for communication to which each communication protocol is applied, and a resource information file which stores accessible resource information based on communication conforming to each communication protocol; with the communication processing method including a step which obtains address information and resource information from the mapping table, and generating and transmitting data processing request packet on which a resource address is set as a destination address based on the obtained resource information.

Further, according to one embodiment of the communication processing method of the present invention, communication status setting processing based on the pico-cell information includes synchronization processing in a physical layer comprising a communication unit.

Further, according to one embodiment of the communication processing method of the present invention, the search step performs transmission processing for a broadcast packet, with the pico-cell information generating step performing processing based on response transmission for the broadcast packet.

Further, according to one embodiment of the communication processing method of the present invention, the mapping table generating step includes processing wherein information including commands information applicable to resource address information and resources, is collected as resource information regarding resources connected by cable to an access point from one or more communicable access points, and the collected information is registered to the mapping table.

According to yet another embodiment of the present invention, a computer program written for executing communication processing to perform data communication on a computer system as to an external device, comprises:

a search step for searching communicable access points;

a pico-cell information generating step for generating communication settings information for each searched access point as pico-cell information;

a mapping table generating step for generating a mapping table which stores available address information conforming to communication protocol applicable to communication as to each access point set in the pico-cell information; and a communication preparatory step for setting an address conforming to a communication protocol based on the mapping table, and performing communication status setting processing based on the pico-cell information.

According to a configuration in an embodiment of the present invention, the configuration wherein a mobile communication processing device, which a user can carry, searches a communicable access point, generates communication settings information for each searched access point as pico-cell information, also generates a mapping table for storing available address information conforming to a communication protocol applied to communication with each access point set in the pico-cell information, sets an address conforming to a communication protocol based on the mapping table, and executes communication status setting processing based on the pico-cell information, is employed, so a network wherein the device itself becomes the master, and one or more access points become slaves, is configured, whereby, even in the event that applied communication protocols of two or more access points set as the slaves in the network are different, communication to each access point can be performed, thereby enabling data processing using connected resources of each access point to be performed.

Moreover, according to the configuration in an embodiment of the present invention, parallel communication processing wherein different access points applying different communication protocols, or different connection resources via different access points can be carried out, by parallel processing applying multiple different network protocol stacks.

Furthermore, according to the configuration in an embodiment of the present invention, resource information regarding a resources connected to access points is collected from one or more communicable access points and registered in a table, which includes address information of the resources and commands information applicable to the resources, thereby enabling precise requests for data processing to be transmitted with reference to the table as to the registered resource.

The computer program according to in an embodiment the present invention is a computer program which is provided to general-purpose computer systems capable of executing various types of program codes which can be provided by a computer-readable storage medium or a communication medium, for example, by storage media such as CDs, FDs, MOs, or the like, or by a communication medium such as a network. Providing such a program in a computer-readable format allows processing corresponding to the program on the computer system to be realized.

Further other objects, features, and advantages of the present invention will become clear with description in further detail based on the later-described embodiments and accompanying drawings. Note that in this specification, the term system implies a logical convergence configuration of multiple devices, and each of the devices in the configuration are not restricted to being stored in one housing.

Additional features and advantages of the present invention are described in, and will be apparent from, the following Detailed Description of the Invention and the figures.

BRIEF DESCRIPTION OF THE FIGURES

FIG. 11 is a drawing summarizing information to be transmitted/received and processing thereof with regard to processing wherein a mobile communication processing device according to the present invention performs communication via two or more access points, and executes data processing.

DETAILED DESCRIPTION OF THE INVENTION

The present invention relates to a communication processing device, a communication processing method, and a computer program. More particularly, the present invention relates to a communication processing device, a communication processing method, and a computer program, wherein with master-slave type small-scale wireless communication processing, setting a mobile terminal of a user as a master and an access point which the mobile terminal can access as a slave, enables the mobile terminal to perform communication using access points as multiple slaves, so data processing using resources connected to two or more access points can be performed.

Description will now be made with regard to a communication processing device according to the present invention, and a communication processing method, with reference to the drawings.

[Overview of Configuration for Network and Data Communication]

First of all, an overview of data communication executed by a communication processing device according to the present invention will be described with reference to the drawings. The communication processing device according to the present invention has a configuration wherein a user can carry the device, and is a mobile type communication processing device which moves to various spaces along with the user.

Figure 1:
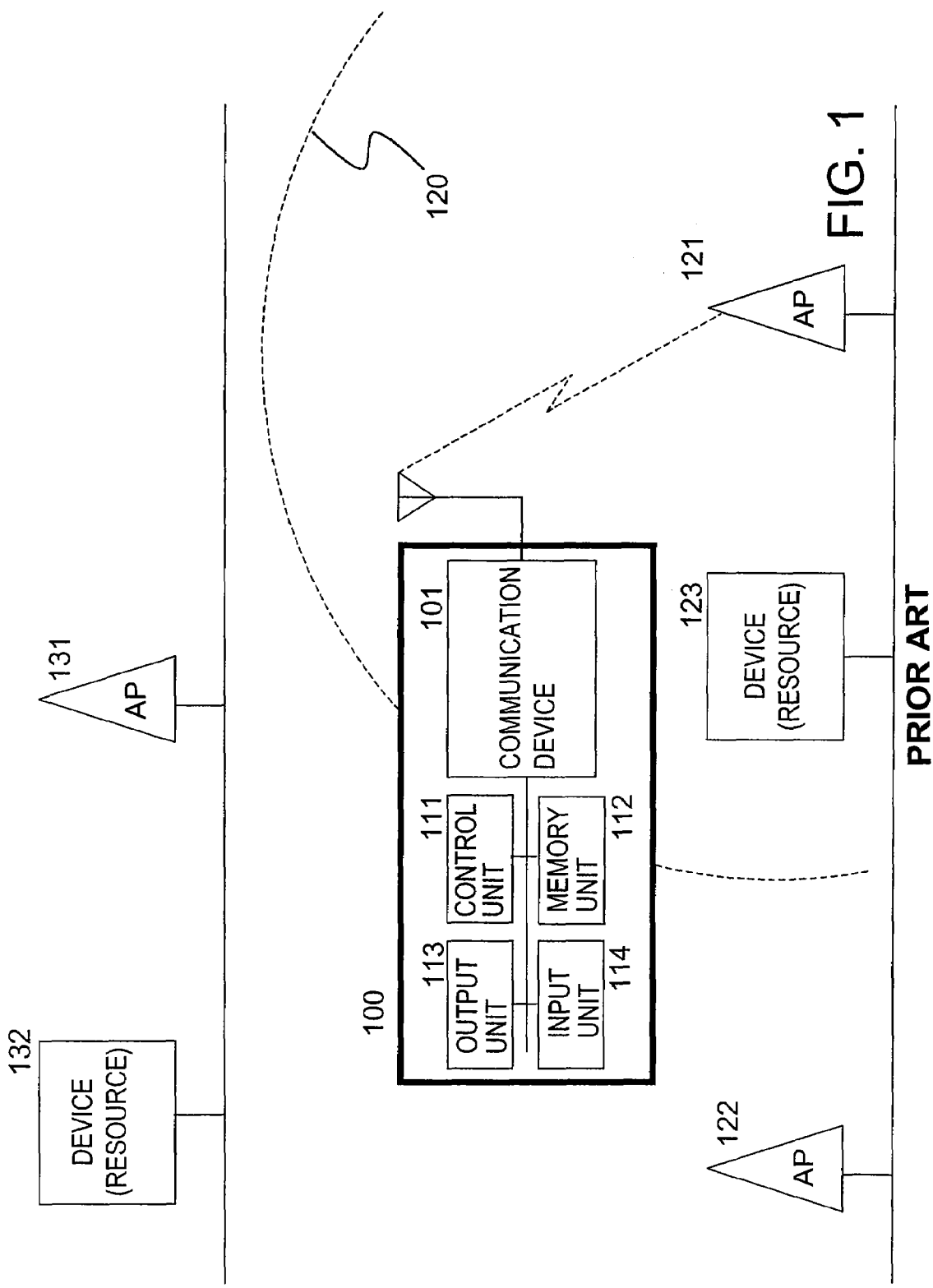
FIG. 1 is a drawing describing a communication configuration between a conventional mobile terminal and one access point.
Figure 2:
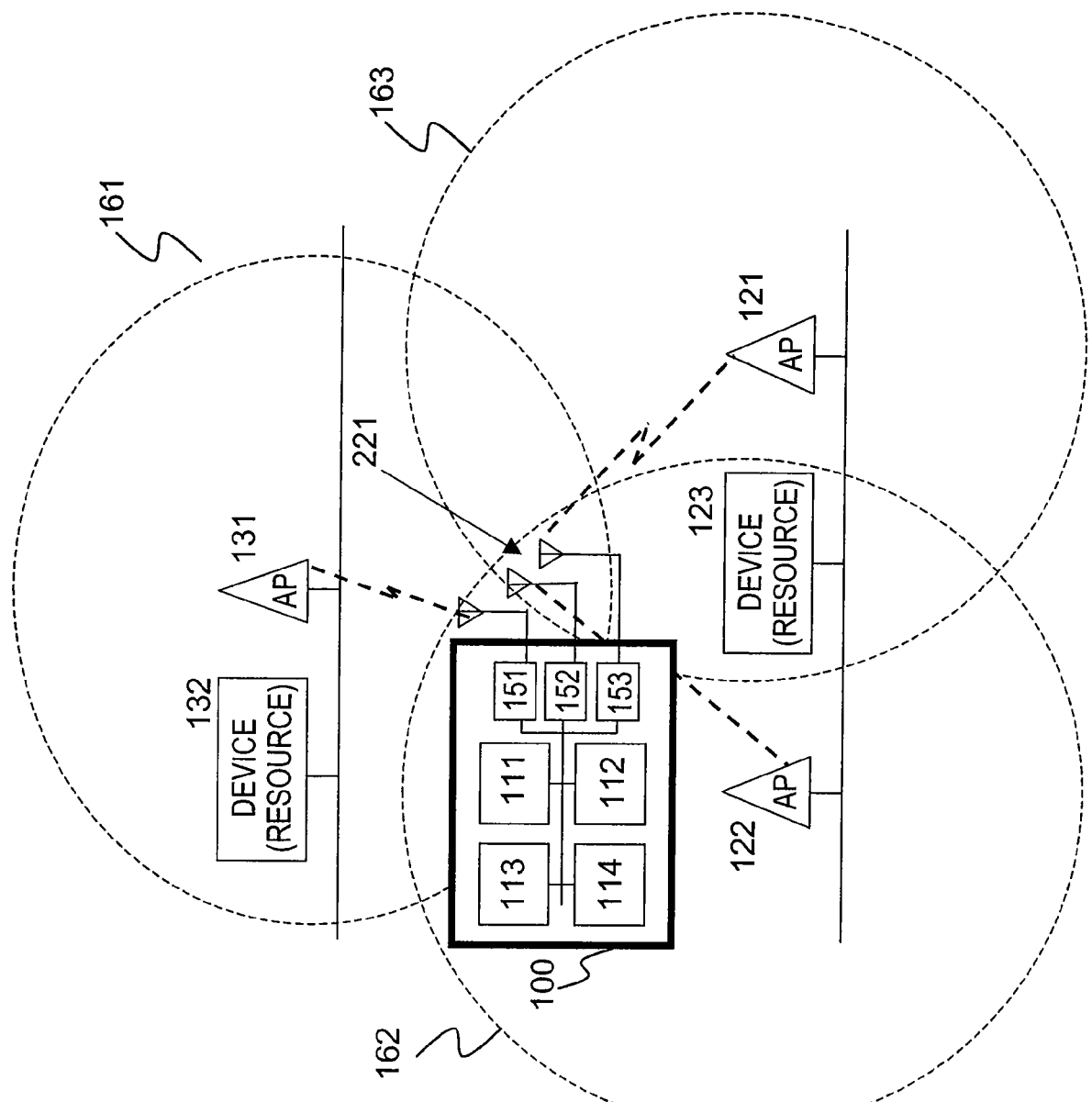
FIG. 2 is a drawing describing a communication configuration between a conventional mobile terminal and two or more access points.
Figure 3:
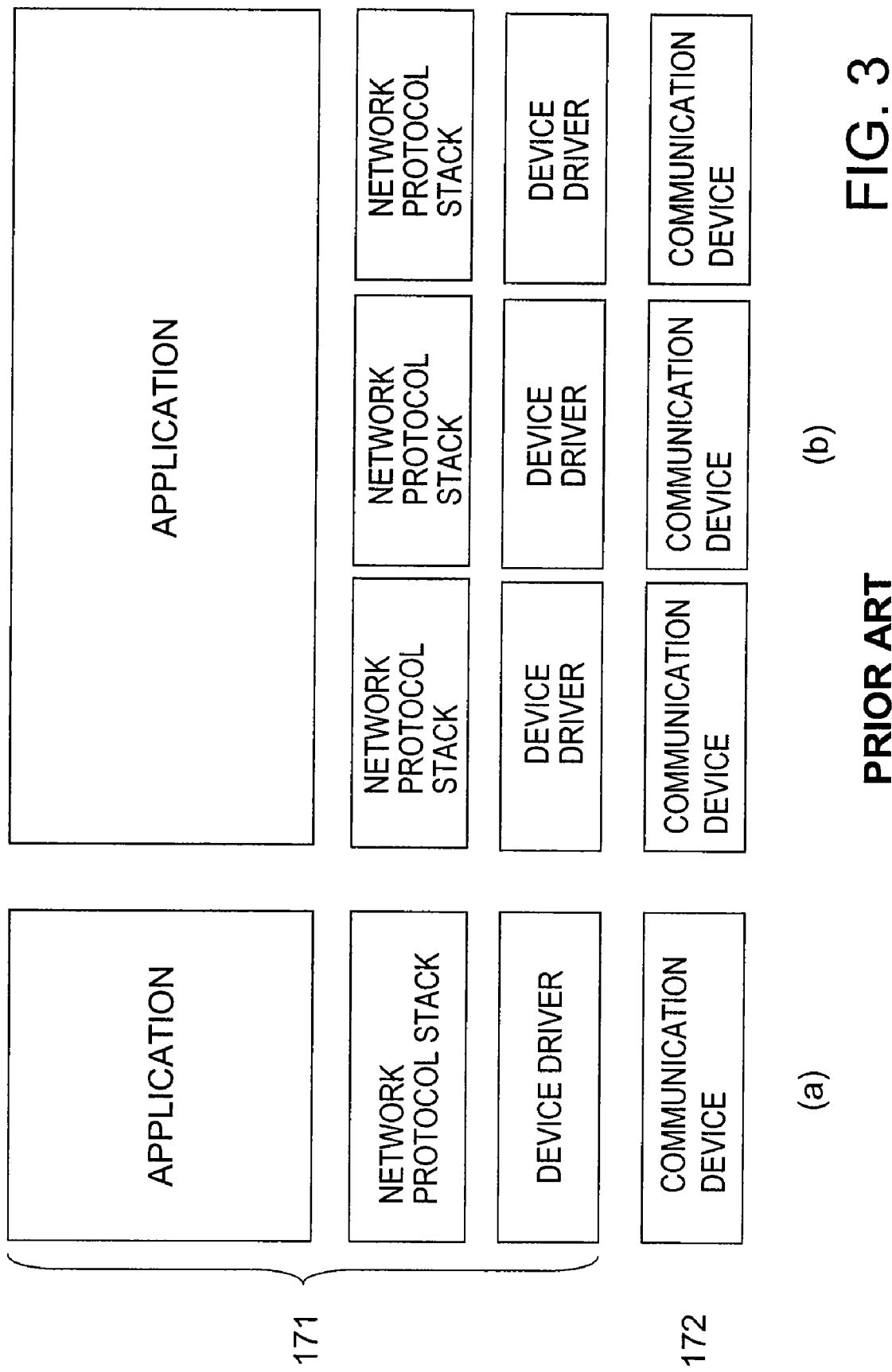
FIG. 3 is drawings describing a required configuration for performing communication between a conventional mobile terminal and two or more access points.
Figure 4:
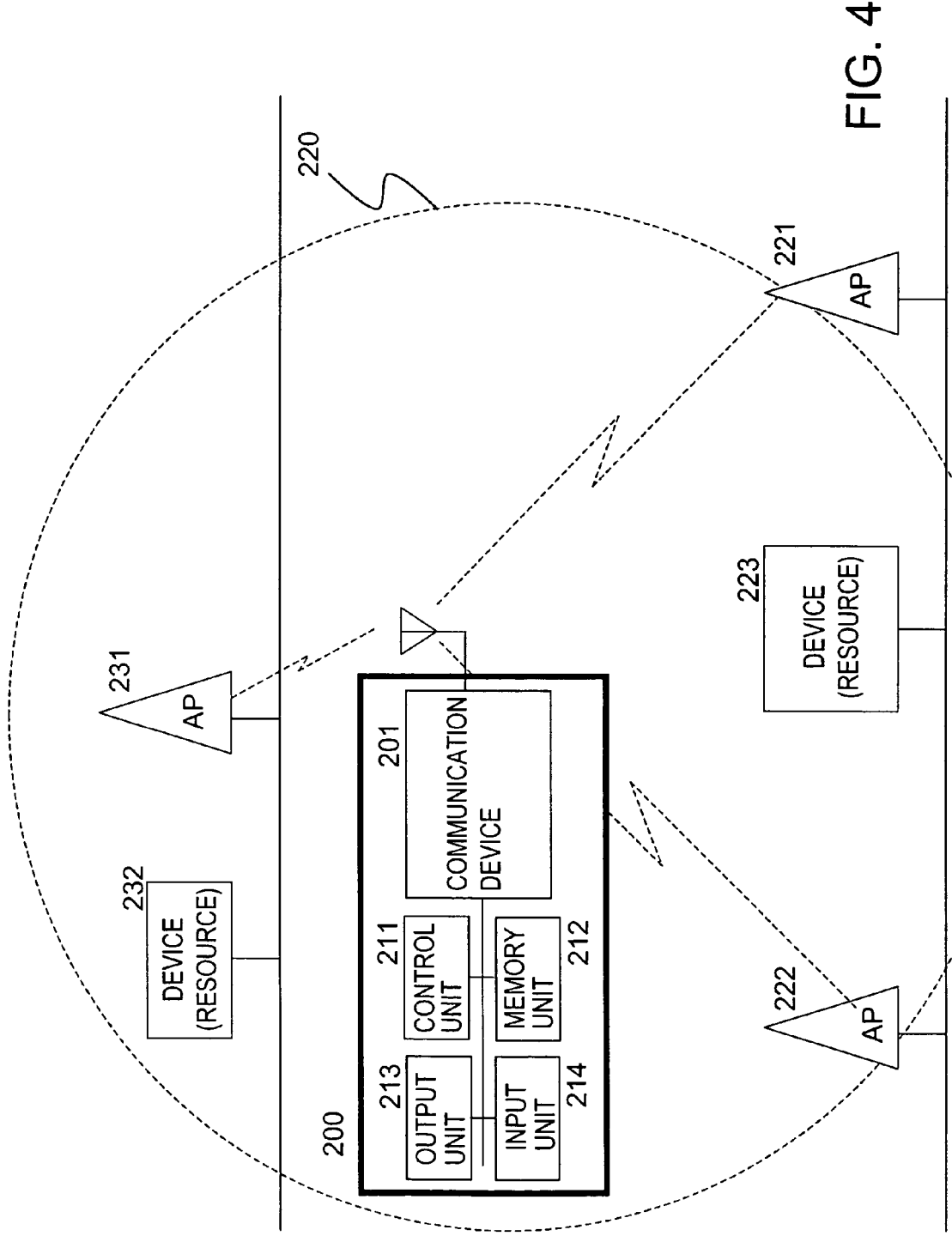
FIG. 4 is a drawing describing a communication configuration between a mobile communication processing device according to the present invention and two or more access points.

For example, let us consider a configuration such as shown in FIG. 4. The configuration shown in FIG. 4 has basically the same placement configuration of access points as with in FIG. 1 and FIG. 2 applied to the conventional art. A mobile communication processing device 200 which a user owns comprises a control unit 211, memory unit 212, output unit 213, input unit 214, and a communication device 201 for performing short-distance wireless communication such as BLUETOOTH, IEEE 802.11, and so forth. The detailed configuration of the mobile communication processing device 200 will be described later.

Access points (AP) 221, 222, and 231 are distributed and fixedly disposed in spatially distanced positions. Any device which can perform communication processing conforming to a predetermined communication protocol may serve as an access point, so for example, a PC serving as a information processing device including a communication device, a home information appliance, or the like, can be set to serve as an access point. Further, each access point is connected with various devices (hardware resources) 223 and 232 such as a VTR, printer, PC, and so forth. The user can establish communication with an access point using the mobile communication processing device 200, thereby enabling a device (resource) connected to the access point to be available.

In the configuration according to an embodiment of the present invention, with such an environment, the mobile communication processing device 200 is set as the master, two or more access points (AP) 221, 222, and 231 provided fixedly are set as slaves, and thus, a small-scale network (pico-net) 220 is formed. The two or more access points (AP) 221, 222, and 223 belong to the pico-net 220 set around the mobile communication processing device 200 which the user owns, are set as slaves, so the mobile communication processing device 200 can perform communication via the slaves in parallel. Consequently, multiple devices (resources) 223 and 232 connected to each of access points 221, 222, and 231 are available.

[Configuration of Mobile Communication Processing Device and Other Devices]

Next, description of the configuration of each device performing master-slave type communication processing, that is, the configuration of a mobile communication processing device carried by a user to be the master, and a configuration example of an access point device serving as a slave, and a resource device, will be made with reference to the drawings. Any device capable of performing communication processing conforming to a predetermined communication protocol may serve as the access point as described above, so a PC serving as an information processing device having a communication device, a home information appliance, and so forth, can be configurable as an access point device.

Figure 5:
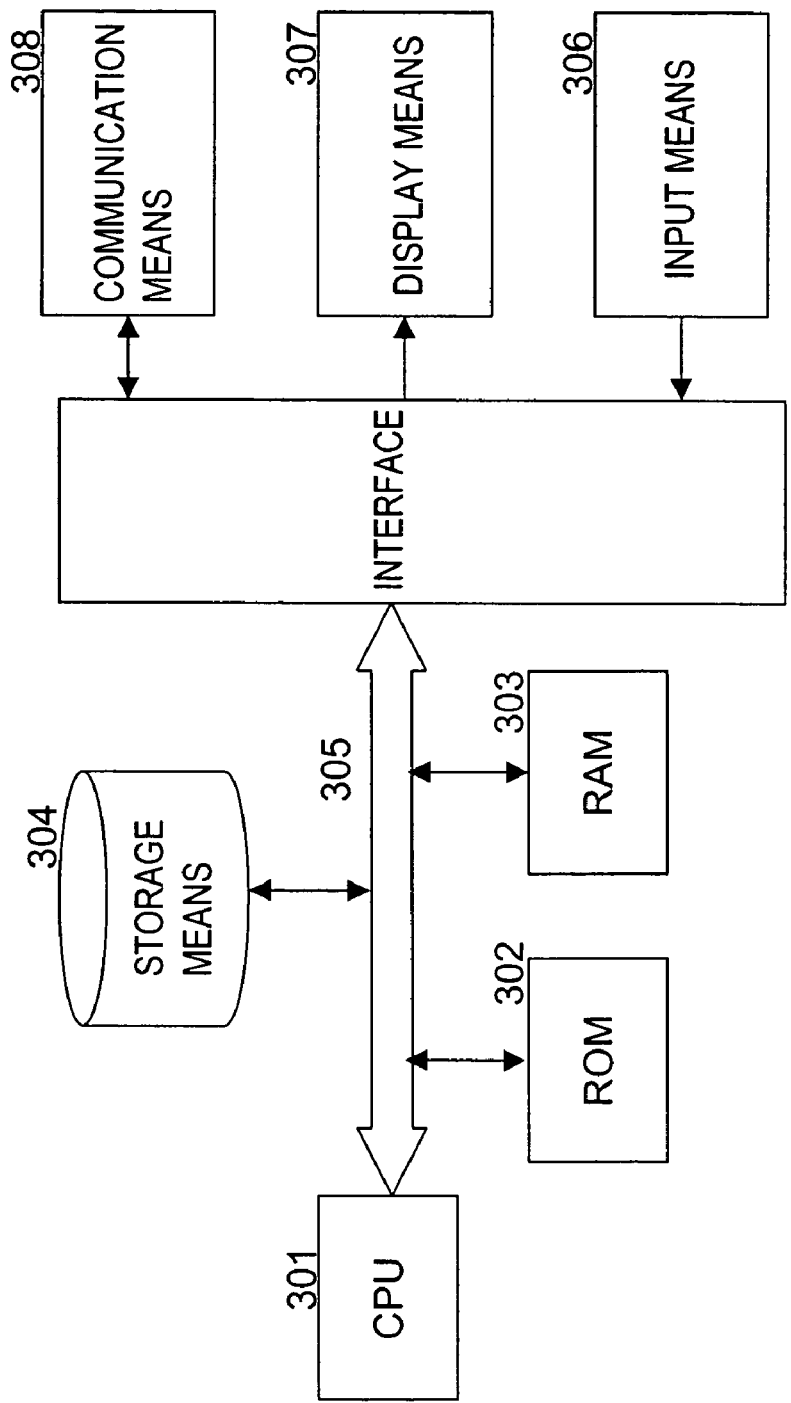
FIG. 5 is a drawing illustrating a configuration example of a mobile communication processing device according to the present invention.

First, description will be made for the configuration of the mobile communication processing device with reference to FIG. 5. A CPU (Central Processing Unit) 301 is a processor for executing various programs functioning as control means. ROM (Read-Only-Memory) 302 stores programs executed by the CPU 301 or fixed data as computing parameters. RAM (Random Access Memory) 303 serves as a storage area to store programs executed in the processing of the CPU 301, and as a work area for storing parameters which change as appropriate during the program processing.

Storage means 304 include, for example, a hard disk, flash memory, or the like, which store the aforementioned mobile directory information and the like. Moreover, positional portions of the mobile directory information may be stored in the ROM 302 or the RAM 303. A bus 305 is configured of a PCI (Peripheral Component Internet/Interface) bus or the like, so data transfer as to each input/output device can be performed via each module and input/output interface.

Input means 306 are input units including various input switches, buttons, keyboards, and pointing devices, for example. In the event of operating an input unit 306 via various input switches or the like, or in the event of receiving data from a communication unit 308 or the like, the CPU 301 receives a command and executes a program stored in the ROM (Read Only Memory) 302. Display means 307, for example, such as a CRT, liquid crystal display, etc., display various information using text, images, and the like.

The communication unit 308 performs wireless communication using for example, BLUETOOTH, IEEE 802.11, infrared data communication, and so forth. BLUETOOTH is a short-distance wireless communication technique meant to replace cable or IrDA (Infrared Data Association) which is an infrared data communication technique, and transmits/receives data and audio information using a 2.45-GHz ISM (Industrial Scientific Medical). Moreover, one master has seven slaves, the communication speed is 721 [Kbps], and output is 0 [dBm] and 20 [dBm] and power consumption is low, and the frequency is high even compared with other hopping and spectrum diffusion methods wherein the frequency is hopped (change frequency) constantly on the transmitting side and the receiving side. Thus, a feature thereof is that directivity is not restricted on transmission/reception of data and audio between the transmitting side and the receiving side.

Next, referring to FIG. 6, a configuration example with access point devices disposed in a space where a user with a mobile communication processing device moves, and devices as resources, will be described.

Access point devices and devices serving as resources, can be configured with various devices such as a locally-connected information processing device for example, specifically a PC, TV, printer, phone, or the like, with a configuration corresponding to each device. FIG. 6 illustrates two examples, (a) and (b).

The configuration example shown in (a) includes a system control unit 323 for performing various sorts of control corresponding to each device. The system control unit 323 has, specifically, control means such as a CPU or the like, and storage means such as a ROM or RAM or the like. Alternatively, a configuration including a dedicated processor for performing processing peculiar to a device may be made. With the storage means 324, device IDs serving as device identifiers, address information required for communication processing, and so forth are stored therein, moreover, information or the like of devices connected to an access point by LAN is stored therein.

The configuration example shown in (a) includes both wireless communication means 321 and cable communication means 322, with wireless communication such as communication with the aforementioned BLUETOOTH, IEEE 802.11, infrared data communication and so forth, for example, being performed, and further, a cable connection to a LAN or the like is also made, so communication with other devices via communication means or communication via a network can be performed in this configuration.

Figure 6:
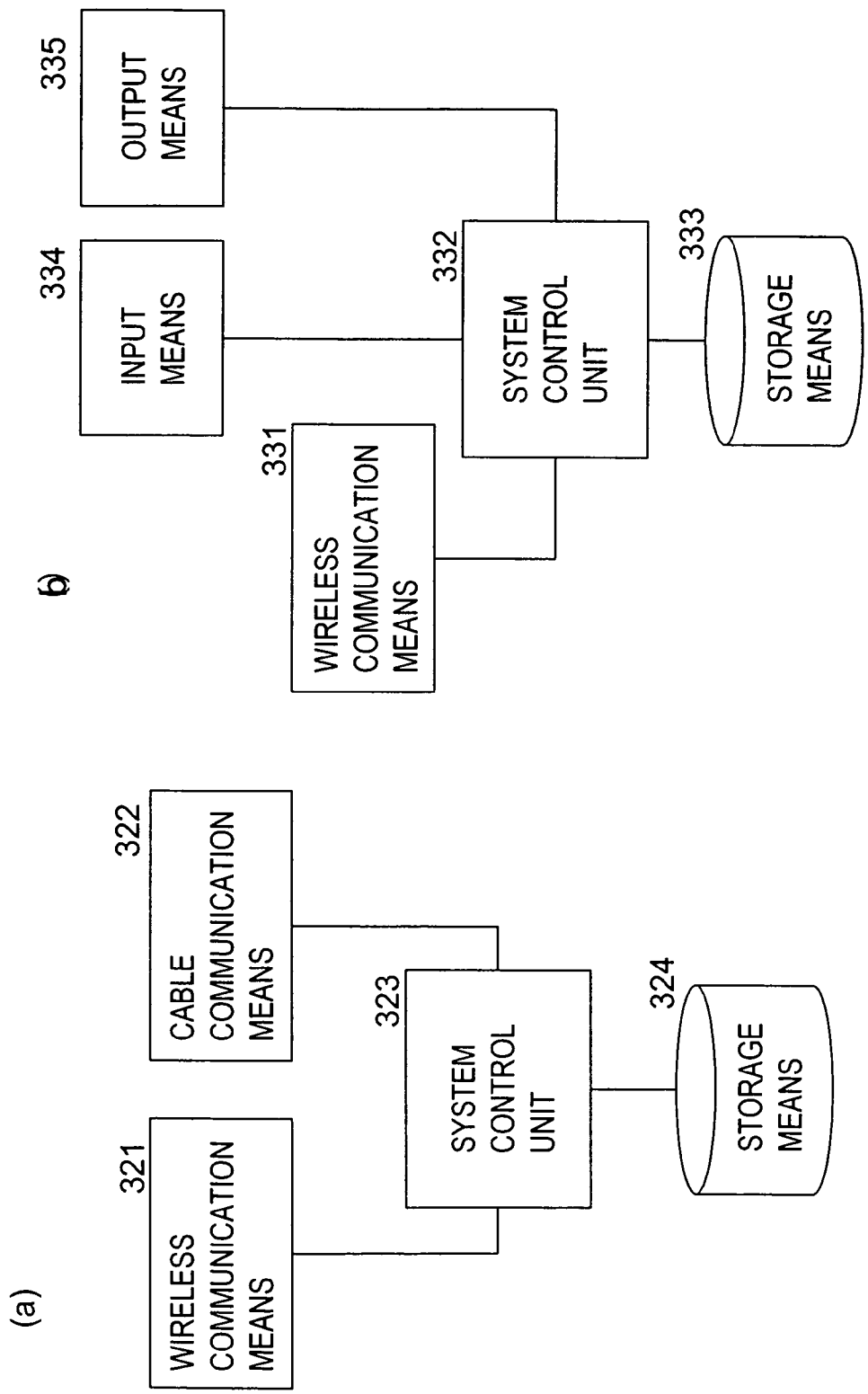
FIG. 6 is drawings illustrating a configuration example of access points and devices (resources).

FIG. 6(*b*) is a configuration example including different access points from (a) and an information processing device as a local connection device. The information processing device shown in (b) includes control means such as a CPU or the like and storage means such as ROM and RAM or the like. Or, a dedicated processor for performing device-specific processing is included, and a system control unit 332 for performing various control corresponding to each device is included. With the storage means 333, device IDs as device identifiers, and address information required for communication processing are stored therein, and information of devices connected by LAN to the access points is stored therein.

The configuration example shown in FIG. 6(*b*) includes wireless communication means 331, and wireless communication, such as communication by the aforementioned BLUETOOTH, infrared data communication, or the like, is performed. Moreover, input means 334 such as switches, a keyboard, mouse, or the like, and output means 335 such as a display, speakers, or the like, are included.

FIG. 6 illustrates two configuration examples, (a) and (b), for an information processing device settable as an access point are shown, however, various devices can be set as access points, and hardware configurations corresponding each device are made.

In the configuration shown in FIG. 4, the access points are devices communicable to the mobile communication processing device 200 with wireless communication, and the devices (resources) can communicate to the mobile communication processing device 200 via an access point with cable communication such as LAN or the like. Accordingly, in the configuration shown in (a) in FIG. 6, the devices (resources) are set as a configuration without the wireless communication means 321. Moreover, if the devices (resources) include the wireless communication means, they can become access points as well.

[Software Configuration of Communication Processing Device]

Next, referring to FIG. 7, a software configuration for realizing communication processing performed by the mobile communication processing device according to the present invention will be described.

The communication processing device according to an embodiment of the present invention has a configuration wherein processing conforming to multiple communication protocols can be performed in parallel. In FIG. 7, a configuration example capable of performing three different communication protocols is shown.

The communication processing device according to an embodiment of the present invention includes one communication device as hardware 372, and performs communication conforming to different communication protocols applying multiple network addresses with the one communication device.

Here, the communication device is used in common, so only one device driver needs to be set in the software 371 for performing control processing of communication devices. Network protocol stacks are set as software for performing processing of each different communication protocol, here, three network protocol stacks are set. Further, one application program for performing specific processing for transmitting/received data is set.

Figure 7:
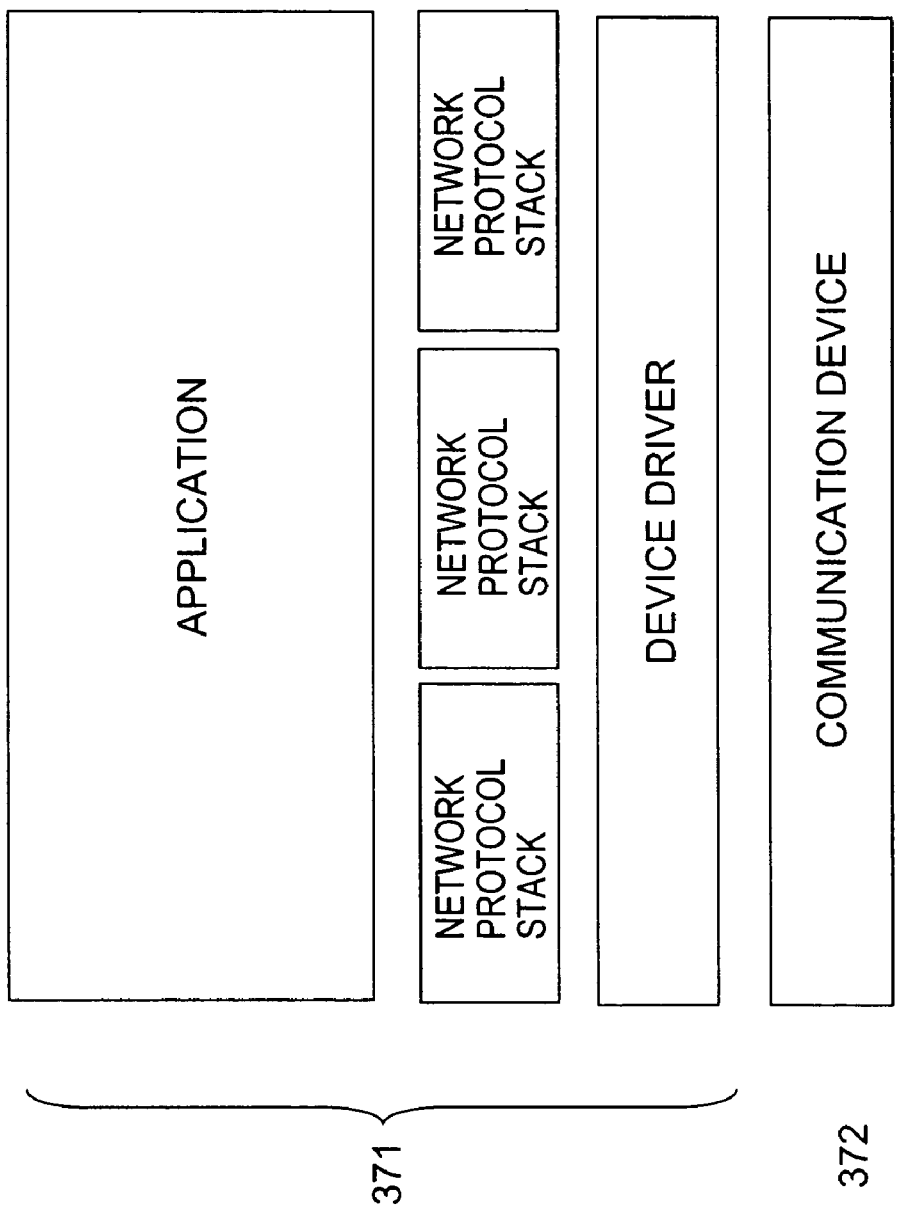
FIG. 7 is a drawing describing a configuration necessary for performing communication between a mobile communication processing device according to the present invention and two or more access points.

Note that in the configuration shown in FIG. 7, an example wherein three network protocol stacks are set is illustrated, but any number of different network protocol stacks corresponding to communication protocol which a communication processing device is assumed to perform, can be set.

Next, referring to FIG. 8, processing in the event that the mobile communication processing device having a software configuration shown in FIG. 7 performs communication will be described.

An application 381 for the mobile communication processing device performs start or end processing of communication based on input from the user. A device driver 385 performs processing referring to a mapping table 411 stored in the memory unit of the communication processing device.

Figure 8:
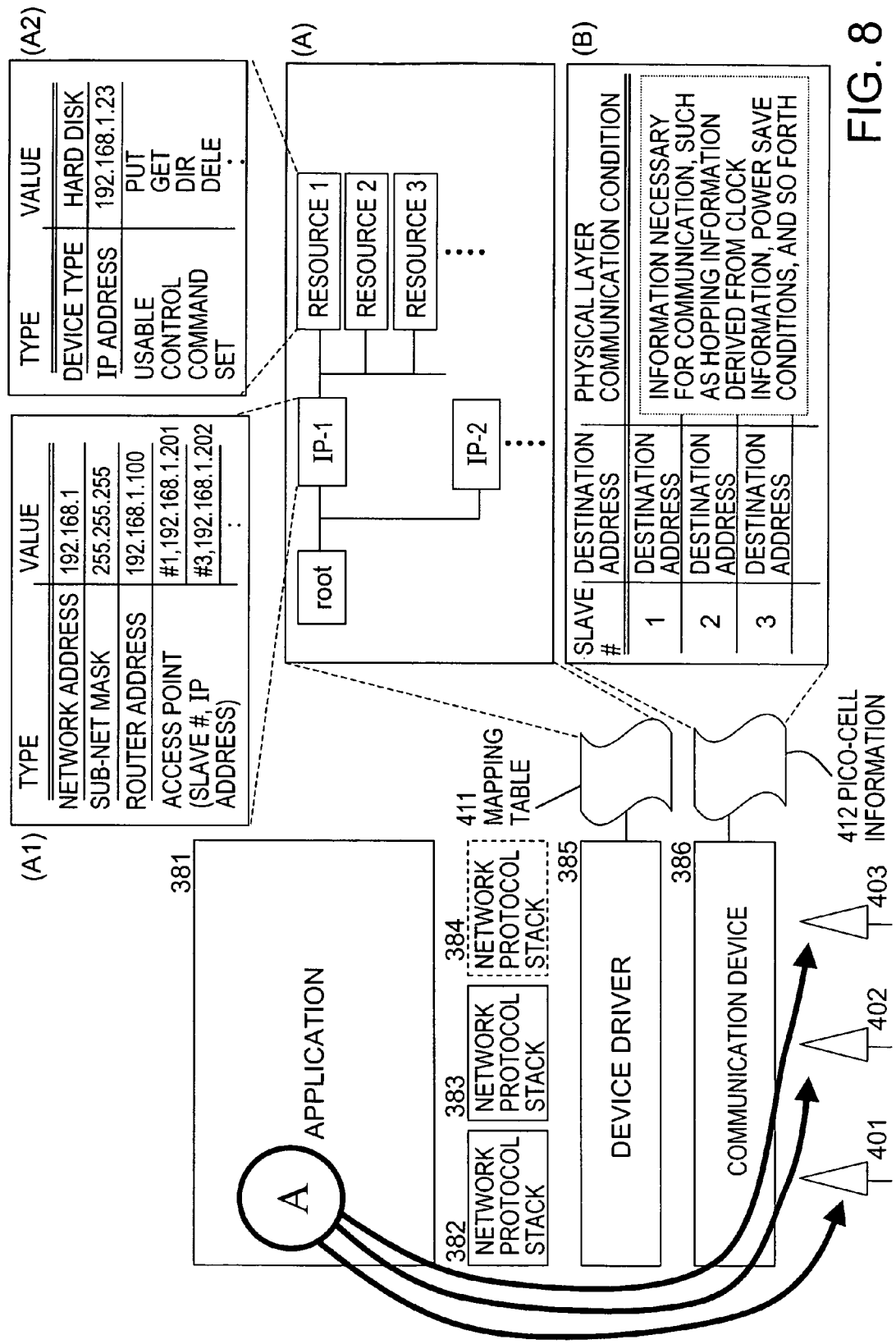
FIG. 8 is a drawing describing information to be obtained by a mobile communication processing device according to the present invention for performing communication, and an information storing table.

With regard to a detailed configuration of the mapping table 411, as shown in (A) in FIG. 8, information for performing communication processing conforming to each communication protocol is stored in this table with a directory configuration. As shown in (A1) in FIG. 8, [IP-1], [IP-2], . . . are address information data files where address information for performing one communication protocol is stored.

As shown in (A1) in FIG. 8, a network address, subnet mask information, and router address information, set for the device itself, are stored in the address data file, and further, one or more addresses of access points (AP) to be connected to in the event of performing communication conforming to the communication protocol thereof, are stored therein.

For example, a network protocol stack for performing processing of a communication protocol corresponding to [IP-1] is a network protocol stack 382 shown in FIG. 8, and in the event that access points for performing communication conforming to the communication protocol thereof are two access points 401 and 402 shown to the bottom left in FIG. 8, address information for these two access points 401 and 402 is stored. These access points 401 and 402 are set as slaves in the network where the mobile communication processing device is set as the master.

The communication protocol [IP-1] and [IP-2] are different communication protocols, so with the mobile communication processing device, a different address corresponding to each communication protocol is set, the address information data files are set for each communication protocol [IP-n], and address information applied to each communication protocol is stored. That is to say, with the mobile communication processing device, in the small-scale network (pico-net) where the device itself is set as the master, an address corresponding to a protocol applied to communication as to each access point is set, thus, addresses are selected and used according to the access point to communicate with.

The address information data files [IP-1], [IP-2], ... of the mapping table 411 further include resource information files [Resource-1] .... The details of the resource information files are shown in (A2) in FIG. 8.

For example, in the resource information file [Resource-1] which is set in the lower directory of the address information data file [IP-1] of the mapping table 411, available resource information is stored in the event of communicating with the communication protocol corresponding to the address information data file [IP-1]. For example, in the configuration shown in FIG. 4, in the event of connecting with the access point 221, the device (resource) 223 is available, and in the event that the address information data file as to a communication protocol to be applied to communication with the access point 221 is [IP-1], the resource information of the device (resource) 223 connected to the access point 221 is stored in the resource information file [Resource-1].

As shown in (A2) in FIG. 8, the device type, device IP address, and control command information available in communication with a device, are stored in the resource information files.

The communication processing device referrers to an address information data file [IP-n] stored in such a mapping table 411 and a resource information file [Resource-m], and obtains address information and device (resource) information therefrom, and performs communication with various resources conforming to a predetermined communication protocol via an access point, and also performs various services using the resources.

Further, the communication device 386 of the communication processing device performs settings following the pico-cell information 412 stored in the memory unit of the communication processing device. A control program controlling communication devices performs settings changing processing, and pico-cell information is generated and used by the control program. Pico-cell information 412, as shown in (B) in FIG. 8, stores both destination device addresses as slave information for access points (AP) and the like for performing communication with the mobile communication processing device, and physical layer communication conditions information as setting conditions of communication devices. For example, with communication applying BLUETOOTH, all devices belonging to the same pico-net need to have a state wherein the frequency axis (frequency hopping pattern) and time axis (time slot) are synchronized, and in communication applying BLUETOOTH, synchronization information and so forth is stored as the pico-cell information 412. The aforementioned information is generated upon starting communication and used during continuous communication.

The control unit made up of the CPU and so forth in the mobile communication processing device performs processing control following the software 371 as described above with reference to FIG. 7. The processing of the control unit is mainly classified into communication information acquisition processing for collecting various types of information required for communication, and communication preparatory processing for performing address settings, synchronization settings and the like, following the collected information. The communication information acquisition processing includes searching for communicable access points, processing for generating pico-cell information from communication settings information for each searched access point, and processing for generating a mapping table for storing available address information corresponding to a communication protocol with each access point set in the pico-cell information; and the communication preparatory processing includes address setting processing according to a communication protocol based on the mapping table, and communication status setting processing based on the pico-cell information.

The control unit of the mobile communication processing device performs control of parallel communication processing with different access points applying different communication protocol or different connection resources via different access points, by parallel processing applying with multiple different network protocol stacks included in the aforementioned software 371 described with reference to FIG. 7. The mobile communication processing device sets itself as the master, and sets a small-scale network (pico-net) where one or more communicable access points are slaves and performs a resource information collection processing regarding a resource connected to an access point from one or more communicable access points set as slaves, and performs processing to register collected resource information on a mapping table.

[Communication Processing Sequence]

Next, a communication processing sequence will be described wherein the mobile communication processing device carried out according to the configuration of the present invention is the host and the access points are slaves. The communication processing sequence is generally divided into the following three phases.

(1) Device Search Phase
(2) Service Search Phase
(3) Data Processing Phase

The device search phase (1) is processing wherein the mobile communication processing device which a user owns is set as the host, and access points within the communicable region of the mobile communication processing device are searched. The service search phase (2) is a processing phase wherein the mobile communication processing device obtains, via an access point, available service information with a connectable device (resource) via a successfully searched and settable access point as a communicable slave. The data processing phase (3) is a phase wherein the mobile communication processing device performs data processing (service) using resources based on the device (resource) information obtained in the service search (2).

Figure 9:
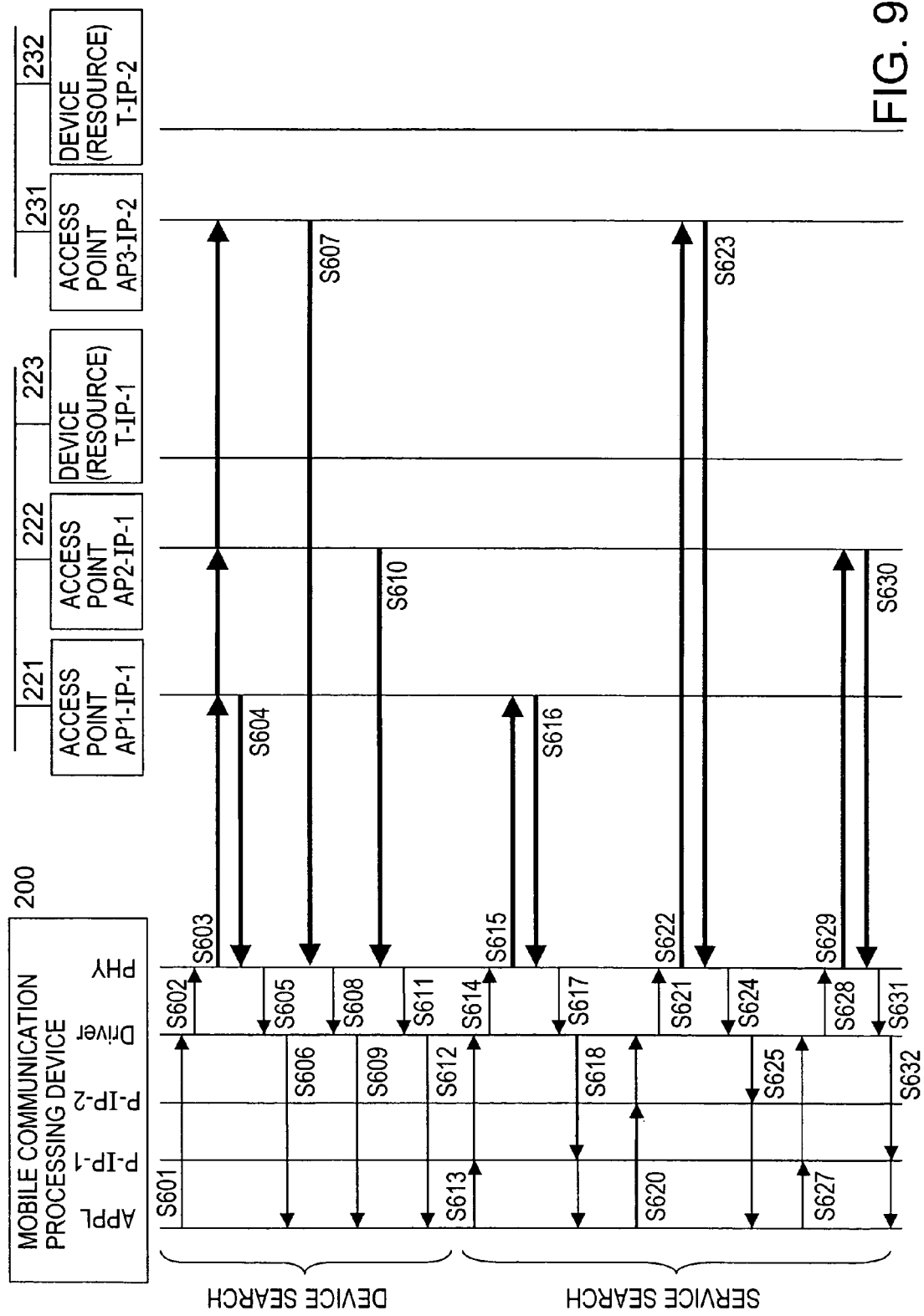
FIG. 9 is a drawing illustrating processing sequences wherein a mobile communication processing device according to the present invention performs communication via two or more access points, and executes data processing.

First, referring to FIG. 9, the processing sequence in the device search phase and service search phase will be described. FIG. 9 illustrates the communication sequence wherein the aforementioned network configuration of FIG. 4 is assumed. As described with reference to FIG. 4, with a wireless communication small-scale network (pico-network) set around the mobile communication processing device 200 which is the host, the two or more access points (AP) 221, 222 and 231 serving as slaves are in a communicable state, and the device (resource) 223 is connected to the access points 221 and 222 by a cable LAN. Also, the device (resource) 232 is connected to the access point 231 by cable LAN.

FIG. 9 illustrates processing sequence to be executed in the state shown in FIG. 4. In the sequence of FIG. 9, from the left, the processing of the mobile communication processing device 200, access point 221, access point 222, device (resource) 223, access point 231, and device (resource) 232, are illustrated.

The mobile communication processing device 200 includes the following:
APPL: application;
P-IP-1: network protocol stack of IP-1 protocol;
P-IP-2: network protocol stack of IP-2 protocol;
Driver: device driver; and
PHY: communication device,
each processing shown separately.

The access point (AP1-IP-1) 221 and the access point (AP2-IP-1) 222 are in a configuration to perform communication processing applying the same communication protocol [IP-1]. The access point (AP1-IP-1) 221, the access point (AP2-IP-1) 222, and the device (resource) 223, are connected by cable LAN.

The access point (AP3-Ip-2) 231 performs communication processing applying the communication protocol [IP-2]. The access point (AP3-IP-2) 231 and the device (resource) 232 are connected by cable LAN.

Under such condition settings, the mobile communication processing device first performs device search processing (steps S601 through S612).

In step S601, a device search request is transmitted to the device driver from an application of the mobile communication processing device. In step S602, the device driver activates the device search function of the communication device. In step S603, broadcasting of the device search protocol is performed. This is performed as processing for searching communicable access points at the present position of the mobile communication processing device. FIG. 11 shows a diagram summarizing transmission/reception of information between devices and processing performed based on transmission/reception of information.

The processing in steps S601 through S603 is equivalent to, for example, the broadcast transmission for inquiry in BLUETOOTH. In the processing for broadcast transmission for inquiry, the master confirms the existence of surrounding slaves as the first stage for establishing synchronous in a pico-net. The mobile communication processing device cannot identify whether the master exists in the pico-net or not, and so transmits an inquiry by broadcast with itself as a pseudo-master.

This transmission of inquiry by broadcast shows that the mobile communication processing device exists as the master, and is performed to obtain an address (BLUETOOTH device address: BD-Address in the event of BLUETOOTH communication) from access points as slaves communicable to the mobile communication processing device as the master, and establishes synchronization between the mobile communication processing device as the master and the access points as slaves.

In step S604, the mobile communication processing device receives a response for the inquiry from the access point (AP1-IP-1) 221 serving as a slave which is communicable thereto. This is equivalent to an FHS packet in BLUETOOTH communication for example, and contains information necessary to establish master-slave communication, besides the slave address (BD-Address).

In step S605, the mobile communication processing device notifies the payload of a reception packet to the driver from the access point (AP1-IP-1) 221 serving as a slave. In step S606, the driver notifies the results to the application. The application performs update processing of the pico-cell information (see FIG. 8) based on the results of notification. That is to say, the application registers the address of the access point (AP1-IP-1) 221 in the pico-cell information based on the reception packet, and records information required for communication processing, such as clock information and so forth.

The steps S607 through S609 are processing of the response from the access point (AP3-IP-2) 231 as to broadcasting from the mobile communication processing device, and processing the response, with the same processing as with the aforementioned steps S604 through S606 being performed. The steps S610 through S612 are processing of the response from the access point (AP2-IP-1) 222 as to the broadcast from the mobile communication processing device, and processing of the response, with the same processing as with the aforementioned steps S604 through S606 being performed.

Consequently, with the pico-cell information (see FIG. 8) of the mobile communication processing device, address information of each access point (AP1-IP-1) 221, (AP3-IP-2) 231 and (AP2-IP-1) 222 is registered therein, and information required for communication processing such as clock information as to each AP and so forth is also recorded therein. The mobile communication processing device has been thus set in a state capable of communication with three access points, by applying this information.

Next, the mobile communication processing device performs service search processing (steps S613 through S632).

In the steps S613 through S615, the service search request is transmitted from the application of the mobile communication processing device to the protocol stack (P-IP-1) for performing protocol processing of the protocol [IP-1], the device driver, and the access point (AP1-IP-1) 221 via the communication device. This request is output as a packet, whose address is the address of the access point (AP1-IP-1) 221 obtained at the aforementioned device search processing and registered in the pico-cell information, clearly shown as a service search request from the mobile communication processing device.

In the step S616, the access point (AP1-IP-1) 221 receiving the service search request generates a response packet storing information required for performing services using a device, such as service information which the access point (AP1-IP-1) 221 and the connected device (resource) 223 can provide, both address information applied to communication processing between the mobile communication processing device and each device, available control commands set and so forth, and transmits the packet to the mobile communication processing device.

In step S617, the response packet received by the communication device of the mobile communication processing device is notified to the device driver. In step S618, the contents of the response packet is notified from the device driver to the application via the protocol stack (P-IP-1) for performing protocol processing of the protocol [IP-1]. The application performs update processing of the mapping table (see FIG. 8) based on the result of notification.

As described with reference to FIG. 8, the mapping table is a table storing information for performing communication processing conforming to each communication protocol, and includes the address information data file and the resource information file. As shown in (A1) in FIG. 8, a network address to be set in itself, subnet mask information, and router address information, and further, addresses of access points (AP) to be connected to in the event of communication with the communication protocol thereof, are stored in the address information data file, and the resource information file has a configuration wherein available resource information is stored therein in the event of communication with a communication protocol corresponding to the address information data file. As shown in (A2) in FIG. 8, the device type, IP address of device, and control commands information available for communication with devices are stored in the resource information file.

This processing is performed as processing with SDP (Service Discovery Protocol) performed between a master and slaves with synchronization established therebetween in the event of BLUETOOTH communication, for example. The SDP is a protocol to confirm available services at that time, and to search functions and services provided by the master as communication processing devices making up of the pico-network or slaves. With the SDP, various providable services by the master and slaves serving as communication processing devices making up the pico-network, such as playing music data, network access, or the like, can be confirmed. A device having BLUETOOTH modules stores services which it can provide as a database, and provides providable service information based on the database in the event of processing with the SDP.

The steps S620 through S625 are service search processing performed between the mobile communication processing device and access point (AP3-IP-2) 231, wherein the same processing as with the steps S613 through S618 is performed, and a response packet storing providable service information of the access point (AP3-IP-2) 231 and the connected device (resource) 232 is transmitted to the mobile communication processing device. The application of the mobile communication processing device performs updating processing of the mapping table (see FIG. 8) based on the notified results.

The steps S627 through S632 are service search processing performed between the mobile communication processing device and access point (AP2-IP-1) 222, wherein the same processing as with the steps S613 through S618 is performed, a response packet storing providable service information of the access point (AP2-IP-1) 222 and the connected device (resource) 223 is transmitted to the mobile communication processing device. The application of the mobile communication processing device performs update processing of the mapping table (see FIG. 8) based on the result of notification.

Consequently, with the mapping table (see FIG. 8) of the mobile communication processing device, registration of the required information for performing services with devices such as the service information providable with the connected devices (resources) via the access points (AP1-IP-1) 221, (AP3-IP-2) 231 and (AP2-IP-1) 222, address information of each device, available control commands set and so forth, is completed.

Figure 10:
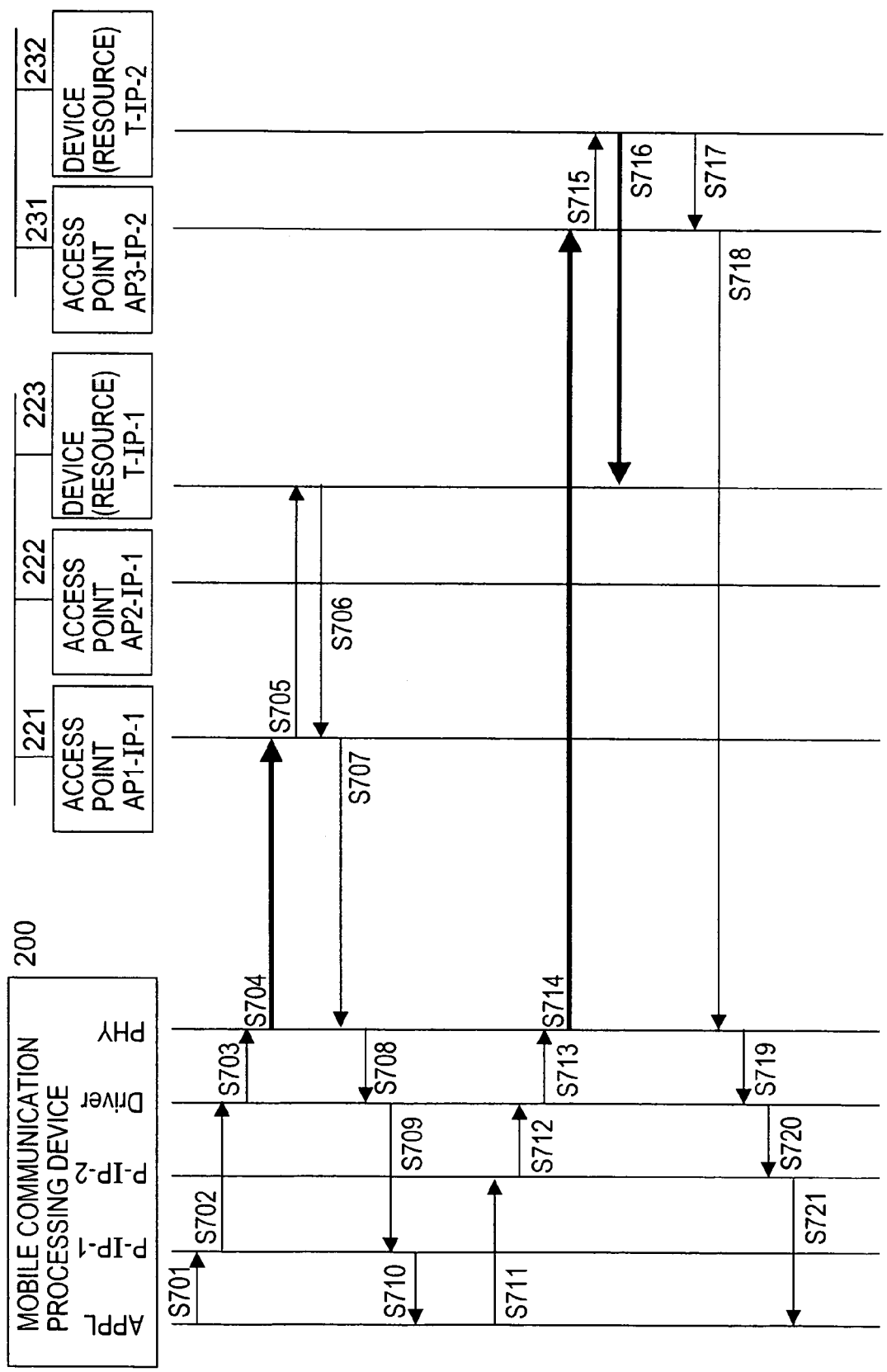
FIG. 10 is a drawing illustrating processing sequences wherein a mobile communication processing device according to the present invention performs communication via two or more access points, and executes data processing.

Next, the mobile communication processing device performs data processing (see FIG. 10, steps S701 through S721) with devices (resources). Here, the device (resource) 223 is connected thereto via the access point (AP1-IP-1) 221, and the device (resource) 232 is connected thereto via the access point (AP3-IP-2) 231, accordingly, data processing services with two devices are performed.

In data processing services, there are various features, and the processing depends on the resource to be employed. Here, for example, the device (resource) 232 is a hard disk storing contents, and the device (resource) 223 is a display for displaying received contents. In this case, a processing example will be described wherein the data belonging to the device (resource) 232 is transmitted to the device (resource) 223.

With the steps S701 through S705, a data processing request packet based on the data processing request information as to the device (resource) 223, generated by the application of the mobile communication processing device, is transmitted to the device (resource) 223 through the protocol stack (P-IP-1) for performing protocol processing of the protocol [IP-1], the device driver, the communication device, and the access point (AP1-IP-1) 221. As for destination addresses of packets, the address of the device (resource) 223 registered in the mapping table (see FIG. 8) generated in the service search processing by the mobile communication processing device, is set therein, and information showing the contents of data processing request such as commands, parameters, and so forth is also stored therein as a payload.

The device (resource) 223 which receives the data processing request packet, in the steps S706 through S710, notifies the received response (Ack) for data processing request to the application based on the reception packet through the access point (AP1-IP-1) 221, the communication device, device driver, and the protocol stack (P-IP-1) for performing protocol processing of the protocol [IP-1] of the mobile communication processing device. In this case, information necessary for performing data processing such as parameters and so forth may be stored therein.

With the steps S711 through S715, a data processing request packet, based on the data processing request information as to the device (resource) 232, generated by the application of the mobile communication processing device is transmitted to the device (resource) 232 through the protocol stack (P-IP-2) for performing protocol processing of the protocol [IP-2], the device driver, the communication device and the access point (AP3-IP-2) 231. As for the destination addresses of packets, the address of the device (resource) 232 registered in the mapping table (see FIG. 8) generated in the service search processing by the mobile communication processing device, is set therein, and information showing the contents of the data processing request such as commands, parameters and so forth is also stored therein as a payload.

In this case, the data processing request is a data transmission as to the device (resource) 223, so the address information of the device (resource) 223 is stored in the data processing request packet, and then transmitted to the device (resource) 232.

The device (resource) 232 which has received the data processing request packet performs data processing based on the received packet. The data processing request is a data transmission as to the device (resource) 223, so the device (resource) 232 sets the address of the device (resource) 223 as the destination address in step S716, and generates a packet whose transmission data is a payload, which is transmitted to the device (resource) 223.

Moreover, in the steps S717 through S721, the device (resource) 232 transmits the received response (Ack) for the data processing request to the application, as a reception response to the data processing request packet from the mobile communication processing device via the access point (AP3-IP-2) 231, and the communication device, device driver, and protocol stack (P-IP-2) for performing protocol processing of the protocol [IP-2], of the mobile communication processing device.

With the aforementioned processing, the data processing request from the mobile communication processing device is transmitted to two different devices each via different access points, whereby data processing services using two separated devices (resources) can be realized.

In the above embodiment, the data processing feature with two devices (resources) has been described, however, service with three or more devices (resources) may be realized with the same procedures as with the aforementioned embodiment. Also, in the aforementioned embodiment, description has been made with access points separated from devices (resources), however, an access point and a device (resource) may be integrated as one communicable information processing device, or a device (resource) may also serve as an access point as well.

[Hardware Configuration Example of Devices]

Figure 12:
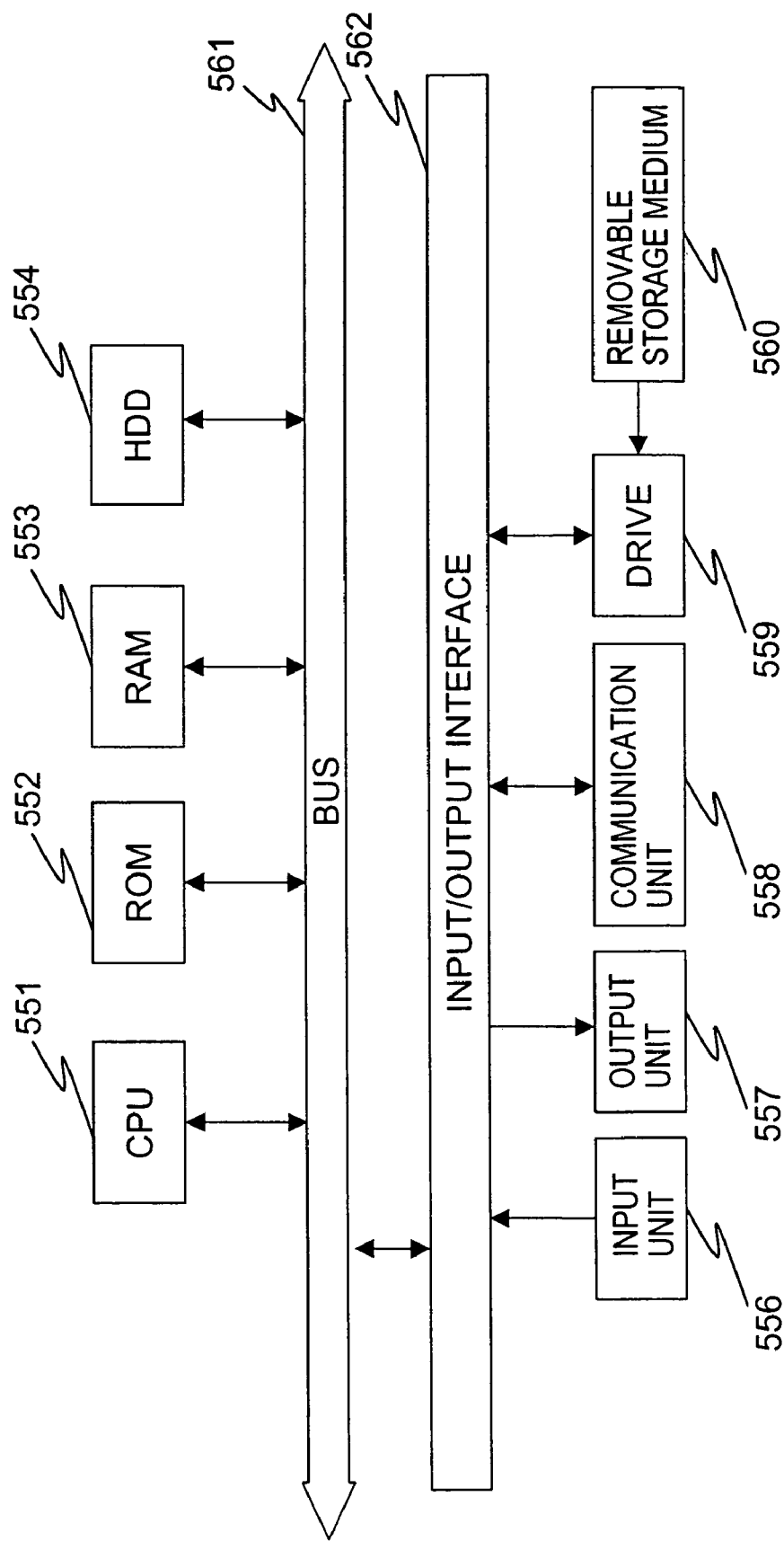
FIG. 12 is a drawing illustrating a hardware configuration example of a mobile communication processing device according to the present invention, access point devices, and resource devices.

Next, a specific example of hardware configuration of devices available as the mobile communication processing device described with reference to FIG. 5, the access point devices and resource devices described with reference to FIG. 6, and resource devices, will be described with reference to FIG. 12.

A CPU (Central Processing Unit) 551 is a processor for executing various programs, functioning as control means. ROM (Read-Only-Memory) 552 stores programs executed by the CPU 551 or fixed data as computing parameters. RAM (Random Access Memory) 553 is used as a storage area and work area for a program executed in processing of the CPU 551 and for parameters changing as appropriate in the program processing.

HDD 554 performs control of a hard disk, and performs storing processing and readout processing of various data and programs as to the hard disk. A bus 561 is configured of a PCI (Peripheral Component Internet/Interface) bus and so forth, and enables data transfer as to each input/output device via each module and input/output interface 562.

An input unit 556 is a input unit including, for example, various input buttons, keyboards, and pointing devices. In the event of the input unit 556 being operated via a keyboard or a mouse or the like, or in the event of receiving data from a communication unit 558, a command is input to the CPU 551, and a program stored in the ROM (Read-Only-Memory) 552 is executed. An output unit 557 is a CRT or liquid crystal display or the like, for example, displaying various types of information by text or images or the like.

The communication unit 558 performs communication processing as to various devices, under control of the CPU 551, and transmits data supplied from each memory unit or data transacted by the CPU 551, and performs processing for receiving data from other devices.

A drive 559 is a drive for performing recording/playback of a removable storage medium 560 such as a flexible disk, CD-ROM (Compact Disc Read Only Memory), MO (Magneto Optical) disc, DVD (Digital Versatile Disc), magnetic disc, semiconductor memory or the like, and reproduces programs or data from each removable storage medium 560, and stores programs or data to the removable storage medium 560.

In the event that the CPU 551 reads out a program or data stored in each storage medium, and executes the program or performs the data, the readout program or data is supplied to, for example, the RAM 553 connected via the input/output interface 562 and the bus 561, and the CPU 551 performs various processing following programs set in the RAM.

As described above, description has been made in detail referring to a particular embodiment of the present invention. However, it is needless to say that one skilled in the art may made various modifications and substitutions to the embodiment without departing from the spirit and scope of the present invention. That is to say, the present invention has been disclosed in a form of one example, which is not intended to be interpreted in a restrictive manner. The essence of the present invention should only be interpreted from the appended Claims.

The series of processing described in this specification can be carried out by hardware, software, or a combined configuration of both. In the event of performing processing with software, a program storing processing sequences may be installed in the memory within a computer having built-in dedicated hardware and executed, or the program may be installed in a general-purpose computer which can execute various processing, and executed.

For example, a program can be stored in a storage medium such as a hard disk or ROM (Read-Only-Memory) beforehand. Or, a program can be temporally or eternally stored (recorded) in a removable storage medium such as a flexible disk, CD-ROM (Compact Disc Read Only Memory), MO (Magneto Optical) disc, DVD (Digital Versatile Disc), magnetic disc, semiconductor memory, or the like. Such removable storage media can be provided as so called packaged software.

Moreover, a program can be transferred to a computer using wireless transfer from a download site, or using online transfer via a LAN (Local Area Network) or the Internet besides installation from the aforementioned removable media, with the computer receiving the program transferred thus, so as to be installed in a storage medium such as a built-in hard disk or the like.

Note that various processing described in this specification can be performed in the described time-sequence, or can be also performed in parallel or independently according to the processing capabilities of the device performing processing or as necessary.

INDUSTRIAL APPLICABILITY

As described above, according to an embodiment of the present invention, a mobile communication processing device which a user can carry searches communicable access points, generates pico-cell information from communication settings information for each searched access point, generates a mapping table storing available address information conforming to a communication protocol applied to communication with each access point set in the pico-cell information, and sets an address corresponding to a communication protocol based on the mapping table, wherein communication status setting processing is performed based on the pico-cell information, so a network wherein the device itself becomes the master and one or more access points are slaves is configured, allowing communication to each access point to be performed even in the event that two or more access points set as slaves in the network have different applicable communication protocols, and accordingly, data processing using connected resources of each access point can be performed.

Moreover, according to an embodiment of the present invention, with parallel processing using multiple different network protocol stacks, parallel communication processing using different access points applying different communication protocol or different connected resources via different access points can be performed.

Furthermore, according to an embodiment of the present invention, a configuration is employed wherein information, including address information of resources and commands information applicable to the resources as resource information regarding resources connected to access points obtained from one or more communicable access points, is collected and registered in a table, allowing precise data processing requests referring to the table as to registered resources, to be transmitted.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A communication processing device comprising:
a communication unit for performing data communication with an external device;
a control unit, for searching communicable access points, generating communication settings information for each searched access point as pico-cell information, performing communication information acquisition processing for generating a mapping table which stores available address information which is set in said pico-cell information corresponding to a communication protocol applicable to communication as to each access point, setting an address conforming to the communication protocol based on said mapping table, and executing communication preparatory processing for performing communication status setting processing based on said pico-cell information; and
a memory unit for storing said mapping table and said pico-cell information.

2. A communication processing device according to claim 1, wherein said communication processing device has a configuration wherein parallel communication processing is performed as to different access points to which different communication protocols are applied, or different connection resources via the different access points, by parallel processing to which a plurality of different network protocol stacks in said control unit are applied.

3. A communication processing device according to claim 1, wherein said control unit has a configuration wherein a small-scale network is set such that said device itself is a master and one or more communicable access points are slaves, and resource information collection processing regarding a resource connected by cable to the access point from one or more communicable access points set as slaves is performed, and processing to enter the collected resource information to said mapping table is executed.

4. A communication processing device according to claim 1, wherein said communication processing device performs wireless communication with short range wireless communication;
and wherein said control unit executes processing for searching one or more communicable access points with inquiry packet transmission using broadcasting, setting a pico-net wherein an access point which transmits a response packet for a broadcast packet is a slave, performing service search processing using SDP (Service Discovery Protocol) as to one or more communicable access points set as slaves, and registering obtained resource information to said mapping table based on the service search processing.

5. A communication processing device according to claim 1, wherein said mapping table is a table which stores information for performing communication processing conforming to each communication protocol as a directory configuration, and includes an address information data file which stores address information required for communication to which each communication protocol is applied, and a resource information file which stores accessible resource information based on communication conforming to each communication protocol;
and wherein said control unit has a configuration wherein address and resource information is obtained from said mapping table, and processing to generate and send a data processing request packet in which a resource address is set as a destination address is performed based on the obtained resource information.

6. A communication processing device according to claim 1, wherein communication status setting processing based on said pico-cell information processed by said control unit includes synchronization processing in a physical layer comprising a communication unit.

7. A communication processing device according to claim 1, wherein said control unit has a configuration wherein search processing for communicable access points is performed as transmission processing for a broadcast packet, and generating and updating processing for said pico-cell information is performed based on response transmission for the broadcast packet.

8. A communication processing device according to claim 1, wherein said control unit has a configuration wherein information including commands information applicable to resource address information and resources, as resource information regarding a resource connected by cable to an access point from one or more communicable access points is collected, and processing to enter the collected information to said mapping table is executed.

9. A communication processing method for performing data communication as to an external device comprising:
searching communicable access points;
generating communication settings information for each searched access point as pico-cell information;
generating a mapping table to which available address information conforming to a communication protocol applicable to communication as to each access point set in said pico-cell information is stored; and
setting an address conforming to a communication protocol based on said mapping table, and performing communication status setting processing based on said pico-cell information.

10. A communication processing method according to claim 9, wherein said communication processing method further includes performing parallel communication processing which covers different access points to which different communication protocols are applied, and different connection resources via the different access points, by parallel processing to which a plurality of different network protocol stacks are applied.

11. A communication processing method according to claim 9, wherein said communication processing method further includes setting a small-scale network wherein said device itself is a master and one or more communicable access points are slaves, and performing resource information collection processing regarding resources connected by cable to the access point from one or more communicable access points set as slaves, and performing processing to register the collected resource information to said mapping table.

12. A communication processing method according to claim 9, wherein wireless communication is carried out using short range wireless communication, and wherein one or more communicable access points with inquiry packet transmission using broadcasting is searched, and a pico-net wherein the access points which transmit a response packet as to a broadcast packet are slaves is set;

further comprising Performing service search processing using SDP (Service Discovery Protocol) as to one or more communicable access points set as slaves, and performing processing to enter resource information obtained based on the service search processing to said mapping table.

13. A communication processing method according to claim 9, wherein said mapping table is a table which stores information for performing communication processing conformed to each communication protocol as a directory configuration, and includes an address information data file which stores address information required for communication to which each communication protocol is applied, and a resource information file which stores accessible resource information based on communication conforming to each communication protocol;

and wherein said communication processing method obtains address information and resource information from said mapping table, and generates and transmits data processing request packet on which a resource address is set as a destination address based on the obtained resource information.

14. A communication processing method according to claim 9, wherein communication status setting processing based on said pico-cell information includes synchronization processing in a physical layer comprising a communication unit.

15. A communication processing method according to claim 9, Transmission processing is performed for a broadcast packet, and said pico-cell information generating step performs processing based on response transmission for the broadcast packet.

16. A communication processing method according to claim 9, wherein processing is included wherein information including commands information applicable to resource address information and resources, is collected as resource information regarding resources connected by cable to an access point from one or more communicable access points, and the collected information is registered to said mapping table.

17. A computer program written for executing communication processing to perform data communication on a computer system as to an external device, said program comprising:

a search step for searching communicable access points;

a pico-cell information generating step for generating communication settings information for each searched access point as pico-cell information;

a mapping table generating step for generating a mapping table which stores available address information conforming to communication protocol applicable to communication as to each access point set in said pico-cell information; and a communication preparatory step for setting an address conforming to a communication protocol based on said mapping table, and performing communication status setting processing based on said pico-cell information.

* * * * *